(12) United States Patent
Holder

(10) Patent No.: US 7,551,628 B2
(45) Date of Patent: *Jun. 23, 2009

(54) WIRELESS DONGLE WITH COMPUTING CAPABILITY FOR EQUIPMENT CONTROL AND METHOD OF OPERATION THEREOF

(75) Inventor: Helen A. Holder, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1512 days.

This patent is subject to a terminal disclaimer.

(21) Appl. No.: 10/138,454

(22) Filed: May 3, 2002

(65) Prior Publication Data

US 2003/0206542 A1 Nov. 6, 2003

(51) Int. Cl.
*H04L 12/56* (2006.01)
(52) U.S. Cl. ........................................ 370/401; 700/121
(58) Field of Classification Search ................... 700/121
See application file for complete search history.

(56) References Cited

U.S. PATENT DOCUMENTS

| | | | |
|---|---|---|---|
| 4,573,954 A * | 3/1986 | Berger et al. ................... 493/55 |
| 5,003,595 A * | 3/1991 | Collins et al. ................... 707/9 |
| 5,627,355 A * | 5/1997 | Rahman et al. ............. 235/380 |
| 6,290,140 B1 * | 9/2001 | Pesko et al. .................... 236/47 |
| 6,629,002 B1 * | 9/2003 | Holder ........................... 700/96 |
| 6,785,513 B1 * | 8/2004 | Sivaprakasam ............. 455/63.1 |
| 7,035,270 B2 * | 4/2006 | Moore et al. ................. 370/401 |
| 2002/0000029 A1 * | 1/2002 | Emoto ......................... 29/25.01 |
| 2003/0018889 A1 * | 1/2003 | Burnett et al. .............. 713/153 |
| 2004/0122542 A1 * | 6/2004 | Yang ............................. 700/94 |

OTHER PUBLICATIONS

"Squid Web Proxy Cache" [online] [Retrieved on: Feb. 20, 2002] Retrieved From: http://www.squid-cache.org/.
"Welcome-The Apache Software Foundation" [online] [Retrieved on: Feb. 20, 2002] Retrieved From: http://www.apache.org/.
"semi.org-The Semiconductor Industry's #1 Bookmark" [online] [Retrieved on: Feb. 18, 2002] Retrieved from: http://www.semi.org/.
"Bluetooth Wireless/How it Works" [online] [Retrieved on: Feb. 18, 2002] Retrieved From: http://www.bluetooth.com/tech/works.asp.
"Nanux::Specialized Link Applications" [online] [Retrieved on: Feb. 25, 2002] Retrieved From: http://www.nanux.com/.

* cited by examiner

*Primary Examiner*—Duc C Ho

(57) ABSTRACT

The present invention includes a dongle, with embedded computing capability, placed in a communication path and capable of passing information from a control device through a smart gateway to a machine, the dongle comprising a network interface configured to receive instructions and an associated identification number from an access point; a machine interface configured to interface with a machine; a memory for storing instructions; and a processor configured to execute the instructions.

20 Claims, 2 Drawing Sheets

WIRELESS DONGLE WITH COMPUTING CAPABILITY FOR EQUIPMENT CONTROL AND METHOD OF OPERATION THEREOF

RELATED APPLICATIONS

The present application is related to commonly assigned U.S. patent application Ser. No. 10/138,453 entitled "WIRELESS NETWORK ACCESS POINT WITH COMPUTING CAPABILITY AND METHOD OF OPERATION THEREOF," and U.S. patent application Ser. No. 10/138,455 entitled "SEMICONDUCTOR AUTOMATION MARKUP LANGUAGE BASED GEM/SEC DEVELOPMENT APPLICATION," concurrently filed herewith, the disclosures of which are hereby incorporated by reference in their entireties.

FIELD OF THE INVENTION

This invention relates generally to data processing machines and, more particularly, to wireless dongles with computing capability.

BACKGROUND OF THE INVENTION

Integrated Circuit (IC) chips are produced in chip fabrication plants. The process of manufacturing IC chips involves multiple steps and many machines to complete the manufacturing process. For example, the process typically includes the steps of deposition, diffusion, metallization, ion implantation and photolithography. Each of these steps may require different machines. Machines, such as chemical vapor deposition, dry etch, electron beam lithography and metal deposition machines are needed to manufacture IC chips and other silicon devices. Each machine performs a specific step and may be programmed by a machine operator. These fabrication machines are quite expensive and often difficult and/or cumbersome to program.

Each time a machine's programmed step is to be changed, a machine operator must reprogram the machine using an input device that is directly wired to the machine. These input devices may be a personal computer or other input terminal device and monitor. Reprogramming machines in a large fabrication plant to perform a different step may require many hours because of the number of machines and the requirement to individually connect to each machine with an input device. A machine operator may use a specification language, such as GEM/SECS, to reprogram the machine.

GEM/SECS is a specification language developed by the Semiconductor Equipment and Materials International (SEMI) trade association. This standard details the requirements for IC machines to communication in a GEM/SECS environment. The capabilities provided in a GEM/SECS environment are extensive and allow a machine operator to design, implement and debug fabrication equipment. More information regarding the GEM/SECS standards can be obtained from SEMI International and on the Internet at http://www.semi.org.

Input devices, such as personal computers, that are connected to fabrication machines for programming are typically connected via an IEEE 1388 port (e.g., parallel port) and include a physical connection to the fabrication machine. A machine operator may transmit control commands that are then executed on the fabrication machine.

In many applications computing devices are interconnected using a Local Area Network (LAN). A LAN may be used to interconnect nodes, such as personal computers, laptops, handheld devices and server platforms. Each node in a LAN may execute programs on its own CPU and is able to access data and devices anywhere on the LAN or, if the LAN is connected to other communication networks, outside the LAN. Users may also use the LAN to communicate with each other, by sending e-mail or engaging in chat sessions. For example, multiple client nodes may be able to share content located on a file server node, exchange e-mail through a mail server or communicate directly on a peer-to-peer basis.

In addition to client and servers nodes, an access point, such as a router or gateway, may be integrated into the LAN. The router or gateway enables the nodes on the LAN to communicate with remote nodes located outside the LAN, such as web servers. The router uses message headers and a forwarding table to determine where a received packet should go, and uses Internet Control Messaging Protocol (ICMP) to communicate with other routers and determine the best route between any two nodes. Routers are able to communicate with nodes in a fixed networked environment, such as by using cables, for example, Category 5 cabling, or in a wireless networked environment, such as by using high-frequency radio waves (e.g., IEEE 802.11 wireless local area network) rather than wires to communicate with nodes. For example, routers are able to communicate with wireless capable devices (e.g., computer laptops or other handheld devices). To communicate with the routers in a wireless environment, the devices may have a wireless network card (e.g., PCMCIA card) to transmit information to and receive information from the router.

Computing applications may use "dongles" to prevent unauthorized access to the computer. A dongle is a small device that physically attaches to a computer to control access to that particular computer. For example, a dongle may prohibit a user from copying data from the computer. Typically, the dongle attaches to a computer port. The dongle may also be configured to pass data coming through the port so it does not prevent the port from being used for other purposes.

SUMMARY OF THE INVENTION

The present invention may include a dongle, with embedded computing capability, placed in a communication path and capable of passing information from a control device through a smart gateway to a machine, the dongle may include a network interface configured to receive instructions and an associated identification number from an access point; a machine interface configured to interface with a machine; a memory for storing instructions; and a processor configured to execute the instructions.

DETAILED DESCRIPTION

Figure 1:
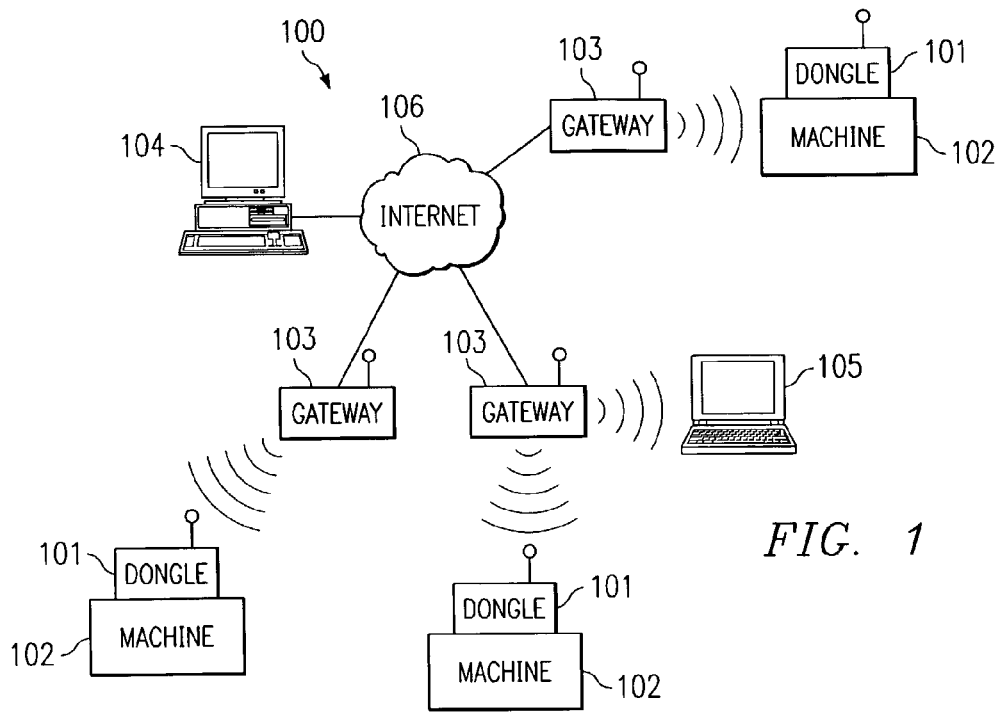
FIG. 1 is a block diagram of a LAN suitable for practicing methods and systems consistent with an embodiment of the present invention.

Machine operators manually program fabrication machines. Each time a machine needs a new control command, the machine operator must directly connect a computer or other input terminal directly to the fabrication machine to program the machine to transfer the new control command(s) to the machine. It may be advantageous to simultaneously program multiple fabrication machines. Such a system would enable machine operators to quickly update or provide many machines with new control commands and would reduce potential errors created by uploading incorrect control commands to a fabrication machine.

Methods, systems, and articles of manufacture consistent with the present invention overcome the shortcomings of manually programming existing fabrication machines by providing a wireless dongle to send and receive instructions to a fabrication machine. A dongle is a device that attaches to a computer to control access to a particular application. The dongle may process incoming information (e.g., information received from a smart gateway via a wireless connection) and may pass the processed information to a port connected to a computer or machine. The wireless dongle enables a machine operator to program multiple fabrication machines. Specifically, the dongle contains intelligence that processes instructions received from a device, such as a handheld device or personal computer. The received instructions are converted into control commands and sent to a fabrication machine through an input/output port, such as a serial port. The wireless dongle is physically connected to the fabrication machine by the input/output port. The handheld devices may communicate with a wireless dongle through a wireless network access point, such as a smart gateway. The wireless network access point is capable of interconnecting various types of devices and managing communication between handheld devices and wireless dongles.

A wireless dongle provides a number of benefits over traditional methods used to program fabrication machines. First, the dongle enables a machine operator to program a fabrication machine remotely because a dongle receives instructions to program a fabrication machine in a wireless manner. Second, the dongle reduces programming time since multiple dongles connected to multiple fabrication machines may receive instructions from a single smart gateway. Each wireless dongle may contain a dongle identification number and each instruction may contain at least one dongle identification number. Thus, only those wireless dongles with dongle identification numbers that match the identification number in the received instruction will execute the instruction. Third, the wireless dongle intelligently communicates with fabrication machines by processing received commands and converting them into control commands that are recognizable to the fabrication machine. The control command may be in a GEM/SECS format. The wireless dongle may contain embedded computing capability (e.g., CPU and memory) to enable such processing.

FIG. 1 depicts network 100 suitable for use with methods and systems consistent with the present invention. Network 100 includes a number of devices, such as machine 102, dongle 101, computer 104 and wireless client 105 all electronically linked via wireless or wireline connections to one or more smart gateways 103. The devices may be connected to smart gateway 103 in a fixed networked environment or in a wireless networked environment. Machines 102 may be semiconductor fabrication machines, such as a chemical vapor deposition machine, dry etch machine or metal deposition machine. Smart gateway 103 may communicate with machines 102 using dongle 101 connected to an input/output port (not shown) on machine 102. For example, dongle 101 may be connected to machine 102 through a parallel port.

Computer 104 and wireless device 105 may be control devices. That is, both may control machines 102 through smart gateway 103 and wireless dongle 101. A control device may be a PC or other computing device capable of transmitting instructions to wireless dongle 101. Wireless device 105 may be a well-known portable personal computer, such as an Hewlett Packard Company (HP) laptop or other handheld device, such as the HP JORNADA handheld and pocket device, available from Hewlett Packard, Inc. Wireless device 105 may also have a wireless network card (e.g., PCMCIA card not shown) to transmit information to and receive information from smart gateway 103. For example, wireless device 105 may use an HP wireless LAN card. Smart gateway 103 may connect wireless dongle 101 and, ultimately, machine 102 and wireless device 105 to a private or public network, such as a LAN, WAN, Private Area Network (PAN) or Internet 106.

Figure 2:
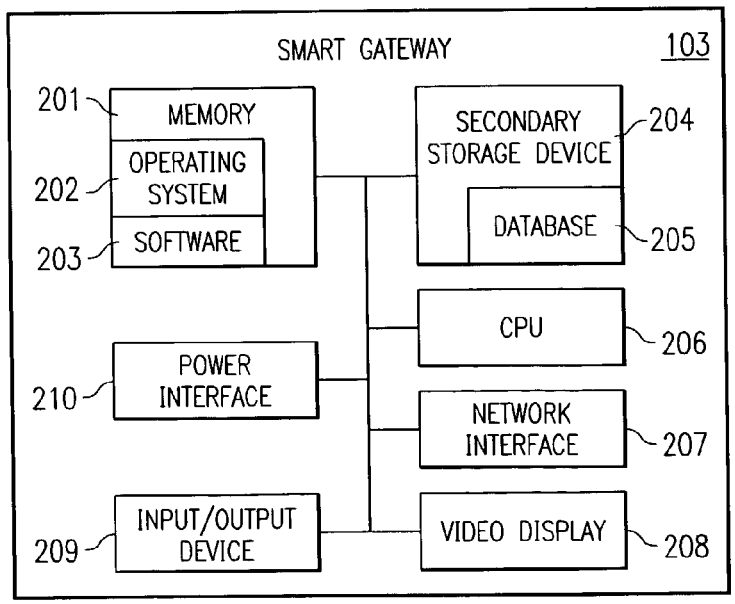
FIG. 2 is a block diagram of the smart gateway according to an embodiment of the invention as depicted in FIG. 1.

FIG. 2 depicts a more detailed view of smart gateway 103, which contains memory 201, secondary storage device 204, central processing unit (CPU) 206, network interface 207, video display 208, input device 209 and power interface 210. Memory 201 stores operating system 202 and software 203. Operating system 202 may serve applications to wireless devices 101. An example of an operating system suitable for use with methods and systems consistent with the present invention is Nanux (a small version of Linux available at http://www.nanux.com) or WINDOWS CE, available from Microsoft, Inc.

Software 203 may program and configure smart gateway 103 and may transmit and receive information, such as machine instructions and associated dongle identification numbers to and from wireless dongles 101 and computer 104 and wireless devices 105. For example, smart gateway 103 may receive a "load wafer" instruction from wireless device 105 intended for a wireless dongle associated with dongle identification number "2. Smart gateway 103 may transmit the instruction and the associated dongle identification number received from computer 104 and wireless device 105 to wireless dongles 101.

Smart gateway 103 may also transmit instructions to one or more dongles 101 located within range of smart gateway 103. For example, smart gateway 103 may receive a "load wafer" instruction from wireless device 105 addressed to dongle identification numbers "2," "3," "7," and "9." Smart gateway 103 may transmit the instruction and the associated dongle identification numbers to all wireless dongles 101. However, only wireless dongles with a dongle identifications number 2, 3, 7 and 9 will transmit the "load wafer" instruction to their respective connected machines. Alternatively, dongle identification numbers may be grouped in such a way as to identify groups of machines. For example, all metal deposition machines may include a "1" prefix and all chemical vapor deposition machines may include a "2" prefix. Transmitting commands to all prefix "1" machines would allow all metal deposition machines to implement the desired update.

Secondary storage device 204 may contain database 205 including information associated with instructions transmitted by wireless device 105. Network interface 207 may be a wired network interface or a wireless network interface. Power interface 210 may interface with a variety of power sources, such as A/C power or fuel cell power.

Figure 3:
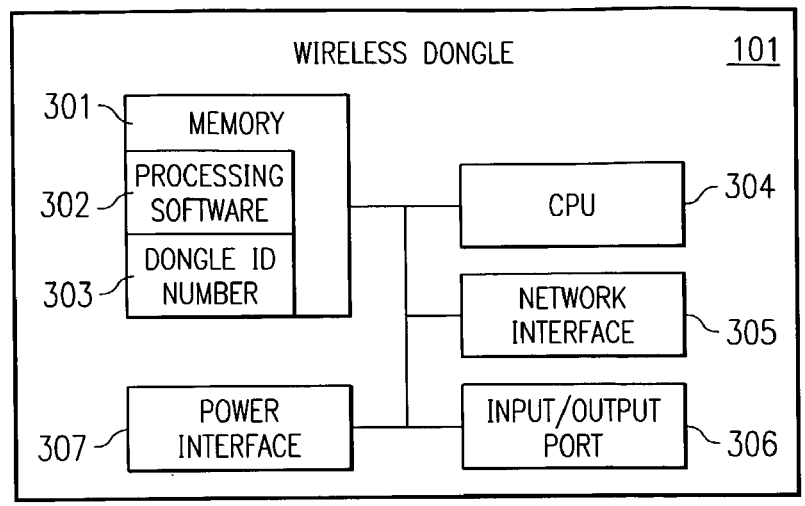
FIG. 3 is a block diagram of the wireless dongle depicted in FIG. 1 according to an embodiment of the invention.

FIG. 3 depicts a more detailed view of wireless dongle 101, which may contain memory 301, central processing unit (CPU) 304, network interface 305, input/output port 306 and power interface 307. CPU 304 provides embedded computing capability. Memory 301 includes processing software 302 and dongle identification number 303. Processing software 302 processes commands received from smart gateway 103. Dongle identification number 303 is used to identify instructions that are designated for that particular wireless dongle 101. Each instruction received from smart gateway 103 containing a dongle identification number that matches dongle identification number 303 stored in memory will be processed and forwarded to machine 102.

Network interface 305 may be a wireless network interface, such as an IEEE 802.11 wireless local area network interface or a Bluetooth radio interface. Bluetooth is a short range radio link technology that provides communications among Bluetooth-enabled devices. Input/output port 306 transmits commands to and receives commands from machine 102. Input/output port 306 may be a RS-232 serial port, bi-directional IEEE 1388 compliant port, such as a parallel port or a Universal Serial Bus (USB) port. Power interface 307 may interface with a variety of power sources, such as A/C power or fuel cell power. Although aspects of software 203 and 302 are described as being stored in memory, note that these aspects may be stored on or read from other computer, readable media, such as secondary storage devices, like hard disks, floppy disks, and CD-ROM; a carrier wave received from a network like the Internet; or other forms of Read Only Memory (ROM) or Random Access Memory (RAM).

Figure 4:
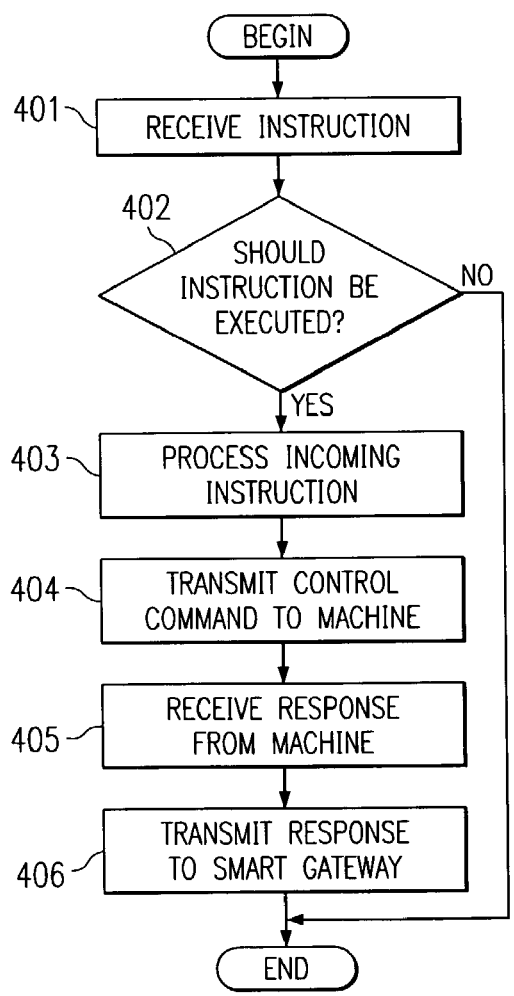
FIG. 4 is a flow chart of the steps performed when processing packets consistent with methods and systems of the present invention.

FIG. 4 depicts a flow chart of the steps performed by wireless dongle 101 when processing instructions received from smart gateway 103. The process instructions procedure is initiated, for example, by receiving an instruction and an associated dongle identification number from a control device (e.g., computer 104 or wireless device 105) through smart gateway 103 (step 401). The received instruction may be for machine 102 to perform an action, such as "Load Wafer" or "Implant Wafer" or "Remove Wafer." The instruction may also be a request for status data or a list of machine control commands that machine 102 is capable of executing. The associated dongle identification number indicates which wireless dongles 101 should execute the instruction. In an alternative embodiment, the process instructions procedure may be initiated by receiving an instruction and an associated dongle identification number from a control device (e.g., computer 104 or wireless device 105) in a direct wireless communication link, such as a piconet, or in a direct local control link, such as a serial port. A piconet is a wireless network of devices connected, for example, using Bluetooth technology.

The instructions may be for a single machine or for a plurality of machines. For example, smart gateway 103 may transmit an instruction designated for certain wireless dongles (e.g., dongles associated with a group of fabrication machines) by including a list of dongle identification numbers within the instruction.

Once the instruction is received by wireless dongle 101, wireless dongle 101 determines if the instruction should be executed (step 402). That is, wireless dongle 101 determines if the instruction is designated for that particular wireless dongle. Wireless dongle 101 compares the dongle identification number associated with the instruction with dongle identification number 303. If the dongle identification number associated with the instruction matches dongle identification number 303, wireless dongle 101 may process the incoming instruction (step 403). To process the instruction, wireless dongle 101 may transform the instruction into a machine control command to be sent to machine 102. Next, wireless dongle 101 may transmit the control command to machine 102 through input/output port 306 (step 404).

If machine 102 is capable of transmitting a response, wireless dongle 101 may receive a response to the transmitted control command from machine 102 (step 405). For example, the response may include an acknowledgement of the received command, an indication that the command has been completed, or a list of machine commands that machine 102 may execute.

Finally, wireless dongle 101 may transmit the response to smart gateway 103 (step 406). Smart gateway 103 may forward the received response to wireless device 105 or computer 104.

As explained, systems consistent with the present invention overcome the shortcomings of existing programming methods by providing a wireless dongle with computing capability. Although dongle 101 may include a combination of hardware and software, dongle 101 may be implemented in software or in hardware alone. Dongle 101 may be further implemented with both object-oriented and non-object-oriented programming systems.

What is claimed is:

1. A dongle, with embedded computing capability, placed in a communication path and capable of passing information from a control device through an access point to a semiconductor fabrication machine, the dongle comprising:
   a network interface configured to receive instructions and an associated identification number from an access point;
   a machine interface configured to interface with the semiconductor fabrication machine;
   a memory for storing instructions; and
   a processor configured to execute the instructions to perform at least one fabrication operation.

2. The dongle of claim 1 wherein the memory further stores instructions for transforming the received instructions into machine control commands.

3. The dongle of claim 1 wherein the machine interface is configured as a serial port interface and wherein the network interface is configured as a wireless network interface.

4. The dongle of claim 1 wherein the memory further includes instructions for processing the received instructions when it is determined that the received instruction is designated for the dongle.

5. The method of claim 4 wherein the memory further includes instructions for determining that the received instruction is designated for the dongle if the identification number associated with said received instruction matches a dongle identification number stored in memory.

6. The dongle of claim 1 wherein the memory further includes instructions for receiving a response from the machine and for transmitting the response to the access point.

7. A method for transmitting instructions to a machine using a dongle connected to the machine and placed in a communication path, the dongle selectively passes a signal including an instruction to the machine in response to wireless receipt of a valid address and the instruction, comprising the steps of:
   receiving an instruction transmitted by a control device in a dongle through an access point in the dongle, wherein the dongle has embedded computing capability to control the machine and wherein the dongle is connected to the machine;
   processing the received instruction; and
   transmitting the processed instruction to the machine, wherein the processed instruction configures the machine to perform at least one fabrication operation.

8. The method of claim 7 wherein processing the instruction further includes the step of transforming the instruction into machine control commands.

9. The method of claim 7 further including the steps of:
transmitting an instruction including at least one identification number from a wireless device to the control device using a wireless protocol, wherein the instruction controls a plurality of machines;
processing the instruction in at least one dongle; and
transmitting the processed instruction to the machine connected to the dongle.

10. The method of claim 9 wherein processing the instruction further includes the step of determining if the at least one identification number transmitted with said instruction matches a dongle identification number associated with the dongle and, if so, processing the received instruction.

11. The method of claim 7 further including the steps of:
receiving a response from the machine; and
transmitting the response to the control device.

12. The method of claim 7 wherein receiving the instruction further includes the step of directly receiving the instruction from the control device using short range radio links.

13. A system for transmitting instructions to a machine using a dongle placed in a communication path and connected to the machine, the dongle selectively passes signals including instructions to the machine in response to wireless receipt of a valid address and the instruction, the dongle comprising:
a network interface configured to receive instructions from an access point;
a memory for storing said received instructions;
processor for processing the received instructions to result in processed instructions; and
a machine interface configured to transmit said processed instructions to the machine;
wherein the processed instructions configured the machine to perform at least one fabrication operation.

14. The system of claim 13 wherein the processing comprises transforming the received instruction into machine control commands.

15. The system of claim 13 wherein the received instructions include at least one identification number, and wherein the instructions controls a plurality of machines.

16. The system of claim 15 wherein the processing determining if the at least one identification number matches a dongle identification number associated with the dongle and, if so, transmitting the processed instructions from the dongle to the machine.

17. The system of claim 13 wherein the machine interface is further configured to receive a response from the machine and wherein the network interface is configured to transmit the response to the access point.

18. A dongle, with embedded computing capability, placed in a communication path and capable of passing information from a control device through an access point to a fabrication machine, the dongle comprising:
a network interface configured to receive instructions and an associated identification number from an access point;
a machine interface configured to interface with the fabrication machine;
a memory for storing instructions; and
a processor configured to execute the instructions, wherein the processed instructions configure the fabrication machine to perform at least one fabrication operation.

19. The dongle of claim 18 wherein said processor is configured to process the received instructions for transforming the received instructions into machine control commands.

20. The dongle of claim 18 wherein said processor is configured to process the received instructions for determining if an identification number transmitted with said instructions matches a dongle identification number associated with the dongle.

* * * * *

UNITED STATES PATENT AND TRADEMARK OFFICE
CERTIFICATE OF CORRECTION

PATENT NO. : 7,551,628 B2  Page 1 of 1
APPLICATION NO. : 10/138454
DATED : June 23, 2009
INVENTOR(S) : Helen A. Holder It is certified that error appears in the above-identified patent and that said Letters Patent is hereby corrected as shown below:

In column 7, line 32, in Claim 13, insert -- a -- before "processor".

In column 7, line 36, in Claim 13, delete "configured" and insert -- configure --, therefor.

In column 8, line 2, in Claim 14, delete "instruction" and insert -- instructions --, therefor.

In column 8, line 6, in Claim 15, insert -- received -- before "instructions".

In column 8, line 7, in Claim 16, after "processing" insert -- comprises --, therefor.

In column 8, line 20, in Claim 18, delete "net work" and insert -- network --, therefor.

Signed and Sealed this

Eighth Day of December, 2009

David J. Kappos
*Director of the United States Patent and Trademark Office*